United States Patent
Nordhoff et al.

(10) Patent No.: US 8,614,100 B2
(45) Date of Patent: Dec. 24, 2013

(54) METHOD AND DEVICES FOR DEPOSITING SAMPLES ON AN ELECTRICALLY SHIELDED SUBSTRAT

(75) Inventors: Eckhard Nordhoff, Berlin (DE); Alan Bullock, Lunen (DE); Christine Lubbert, Berlin (DE); Antonin Schenk, Brno (CZ); Holger Eickhoff, Syke (DE); Martin Horn, Berlin (DE)

(73) Assignee: Scienion AG, Berlin (DE)

( * ) Notice: Subject to any disclaimer, the term of this patent is extended or adjusted under 35 U.S.C. 154(b) by 1301 days.

(21) Appl. No.: 10/576,644

(22) PCT Filed: Oct. 20, 2004

(86) PCT No.: PCT/EP2004/011878
§ 371 (c)(1),
(2), (4) Date: Feb. 17, 2011

(87) PCT Pub. No.: WO2005/039771
PCT Pub. Date: May 6, 2005

(65) Prior Publication Data
US 2012/0101008 A1    Apr. 26, 2012

(30) Foreign Application Priority Data
Oct. 23, 2003  (DE) .................................. 103 49 493

(51) Int. Cl.
*G01N 1/10*          (2006.01)
(52) U.S. Cl.
USPC ............. 436/180; 436/54; 422/501; 422/509; 422/518; 422/519
(58) Field of Classification Search
USPC ............. 422/501, 518, 519, 509; 436/180, 54
See application file for complete search history.

(56) References Cited

U.S. PATENT DOCUMENTS

| | | | |
|---|---|---|---|
| 3,927,471 A | 12/1975 | Tricker | |
| 4,322,449 A | 3/1982 | Voss et al. | |
| 5,468,911 A | 11/1995 | Leve | |
| 7,118,909 B2 * | 10/2006 | Gevaert et al. | 435/288.4 |
| 7,211,442 B2 * | 5/2007 | Gilbert et al. | 436/177 |
| 2002/0003177 A1 | 1/2002 | O'Connor | |

FOREIGN PATENT DOCUMENTS

| | | |
|---|---|---|
| EP | 1 099 484 A1 | 5/2001 |
| EP | 1 186 888 A1 | 3/2002 |
| GB | 2 386 331 A | 9/2003 |
| WO | WO 98/56894 | 12/1998 |
| WO | WO 98/58745 | 12/1998 |
| WO | WO 01/71311 A2 | 9/2001 |
| WO | WO 02/094442 A1 | 11/2002 |
| WO | WO 03/028868 A2 | 4/2003 |

* cited by examiner

*Primary Examiner* — Brian R Gordon
(74) *Attorney, Agent, or Firm* — Kelly & Krause, L.P.; W. Dennis Drehkoff

(57) ABSTRACT

A method for depositing samples, in which at least one sample (10) is arranged on a substrate (30), comprises the following steps: positioning a sample dispenser (20) above the substrate (30), and actuating the sample dispenser (20) so that the sample (10) is moved from the sample dispenser (20) along a trajectory (11) to a predefined deposition position (32) on the substrate (30), wherein at least part of the trajectory (11) is shielded against electrical interference fields. Also described is a substrate (30) for receiving samples (10), comprising a substrate body (31), on the surface of which at least one deposition position (32) is provided, and a shielding electrode (40), which is designed so as to electrostatically shield the space above the at least one deposition position (32) against electrical interference fields.

19 Claims, 3 Drawing Sheets

METHOD AND DEVICES FOR DEPOSITING SAMPLES ON AN ELECTRICALLY SHIELDED SUBSTRAT

BACKGROUND

The invention relates to methods for depositing samples having the features of the preamble of claim 1, in particular to methods for forming sample arrays in compartments of reaction substrates or reaction plates, such as microtitre plates for example, and to devices for implementing such methods.

It is generally known in biochemistry and genetic engineering to carry out chemical reactions with very small sample volumes using an array technique, in which the reactants are deposited as sample arrangements (arrays) on substrates, brought to reaction and observed. The substrates used are typically glass surfaces onto which very small amounts of sample (e.g. pl volumes) are applied for example by means of so-called picking-spotting tools. Picking-spotting tools have the advantage that the samples can be positioned with high accuracy. However, it is disadvantageous that operation thereof is time-intensive and places particular requirements on the substrate and its physical accessibility. As an alternative, the samples can be applied to the substrate in a contactless manner by means of piezoelectric dispensers, and these have advantages in terms of the speed and the ability to be used in the case of different forms of substrate.

However, contactless deposition of samples, in which no contact takes place between the sample dispenser and the substrate surface, may give rise to reduced accuracy in terms of sample positioning. The droplets or particles of sample move along a trajectory from the sample dispenser to the substrate, wherein the course of the trajectory is known only if the dispenser has been carefully calibrated and can easily be disrupted by external influences. This poses a problem in particular when producing arrays with high sample densities.

Particular problems may arise during the contactless positioning of samples onto substrates which are made at least partially of plastics materials. Experience has shown in practice that it has to date not been possible to use piezoelectric dispensers to produce dense arrays on plastic substrates with high accuracy and reproducibility.

There is particular interest in forming arrays on the bottoms of the compartments of reaction plates, such as microtitre plates or nanotitre plates for example. These reaction plates usually comprise wells made of plastic. When samples are deposited into the wells by means of piezoelectric dispensers, the samples often do not land at the intended positions on the bottom of the well but rather on the walls of the well for example.

BRIEF SUMMARY OF THE INVENTION

The objective of the invention is to provide an improved method for depositing samples by means of contactless dispensers, by virtue of which the disadvantages of conventional dispenser techniques are avoided and which in particular is characterized by high accuracy and reproducibility in terms of the deposition of the samples. The intention is to avoid the inaccuracies observed to date on plastic-based substrates and to allow increased sample array densities. The improved method is intended in particular to allow the deposition of samples into the compartments of reaction plates, such as microtitre plates or nanotitre plates for example. Further objectives of the invention consist in providing improved devices for implementing the inventive method for depositing samples. The devices are intended in particular to allow the accurate and reproducible deposition of samples in high densities, and to be compatible with known array techniques.

These objectives are solved by methods and devices having the features according to claim 1, 12 or 26. Advantageous embodiments and uses of the invention emerge from the dependent claims.

With regard to the method, the invention is based on the general technical teaching which involves, during the deposition of at least one sample in droplet or particle form onto a substrate surface, shielding against electrical fields at least part of the path (dispensing path, trajectory) traveled by the sample between the contactless sample dispenser and the substrate surface. The inventors have found that the inaccuracy observed in the conventional sample deposition technique is caused by electrical interference fields, which emanate from individual charges formed for example by frictional electricity on the substrate surface. By electrostatically shielding at least the part of the dispensing path, which runs in the vicinity of the substrate surface, the electrical interference fields are compensated. The deposition position is now thus influenced only by the properties and operating parameters of the sample dispenser and no longer by randomly distributed interference fields as was the case in the conventional dispensing techniques. Furthermore, the shielding advantageously provides for passive correction, which, unlike the operation of conventional electrostatic dispensers, does not require any active control of the dispensing of the droplets. Further details regarding the advantageous effect of the shielding according to the invention will be explained below with reference to FIGS. 1 and 2.

According to a preferred embodiment of the invention, at least one shielding electrode is used for the purpose of shielding against the electrical interference fields emanating from the substrate surface, which shielding electrode covers or surrounds at least part of the trajectory of the sample or runs along this part of the trajectory. The shielding electrode acts like a Faraday cage. The inventors have found that the shielding electrode at one side need not make contact with the substrate surface and at the other side need not extend as far as the sample dispenser, but rather has to shield in particular the part of the trajectory in which the interference fields give rise to force effects, which deviate from the movement direction of the samples.

According to one preferred variant, the shielding electrode used according to the invention may be formed by a component, which can be separated from the substrate and which comprises at least one electrode sleeve, through which the at least one trajectory of the samples runs. The advantage of a separate shielding electrode lies in the fact that this can be used as an add-on part for geometric adaptation to the substrate formats in respect of conventional substrates. The inventive method for depositing samples can thus be carried out using conventional substrates, which are optionally optimized in terms of temperature resistance or shape stability for certain process steps. The use of the at least one electrode sleeve as shielding electrode has the additional advantage that this can be arranged on or above the substrate prior to the dispensing steps in time terms, so that compatibility with conventional dispensing techniques is thus provided.

According to a second variant, the shielding electrode may be formed by an electrostatically shielding coating on the substrate. Finally, the shielding electrode may be formed by the substrate itself or at least a partial region of the substrate if the latter consists of an electrically conductive material. In these variants, advantages are obtained in terms of a compact substrate structure, which is compatible with conventional dispensing techniques.

According to the invention, combinations of the aforementioned variants may be provided to form the shielding electrode. For example, the shielding electrode may be formed by a combination of a separate component and a substrate coating.

According to a further preferred embodiment of the invention, the shielding electrode may be at a free potential, that is to say may be arranged such that it is electrically insulated from the surroundings. The inventors have found that the presence of the shielding electrode, even without connection to a reference potential, is sufficient to compensate the small fields caused by the charges located on the substrate surface. In the shielding electrode, a very small amount of charge is influenced, which is distributed on the shielding electrode without any problems, without forming further interference fields.

Alternatively, the shielding electrode can be connected to a certain electric reference potential in order to achieve an improved shielding effect. Preferably, ground potential (earth potential) is used as reference potential.

One particular advantage of the method according to the invention is obtained when depositing samples on substrates (reaction plates) comprising chambers or compartments, which are separated from one another by compartment walls. Since charges located on the compartment walls could potentially exert very strong electrical forces, the direction of which deviates from the movement direction of the samples towards the respective deposition position, the shielding electrode according to the invention is particularly effective when it is inserted into the compartments, so that the interference fields emanating from the side walls of the compartments or wells are shielded. The shielding electrode preferably extends over the height of compartment walls, which protrude above the substrate surface.

The aforementioned advantages are observed in particular when forming sample arrays, that is to say when depositing a plurality of samples at closely adjacent deposition positions in the compartments, since the sample paths or trajectories leading to the various deposition positions of the sample array can be jointly shielded by one shielding electrode. Advantageously, the shielding has the same effect for all the dispensing steps, so that sample arrays can be formed with a high density and reproducibility.

When the samples or sample arrays are deposited on the bottoms of the compartments (chambers) of reaction plates, further advantages are obtained with regard to the stable positioning of the shielding electrode on the compartment walls and on the other hand in respect of the further processing of the samples or sample arrays in the compartments. So, preferably it is used as the reaction plate a microtitre plate or nanotitre plate, which is known per se and having a matrix-like arrangement of wells, on the bottom of which the samples or sample arrays are deposited. Compatibility with subsequent process steps using the microtitre plate or nanotitre plate is thus obtained.

When a shielding electrode comprising a number of electrode sleeves, which are arranged in a manner corresponding to the geometric distribution of the compartments or wells of the reaction plate is used for electrical shielding purposes, advantages may be obtained in respect of particularly simple handling of the shielding electrode.

With regard to the device, the aforementioned objective of the invention according to a first aspect is solved by providing a substrate comprising a substrate body, on the surface of which at least one deposition position is provided for receiving at least one sample, wherein the substrate is equipped with a shielding electrode for electrostatically shielding interference fields above the deposition position. Advantageously, electrical interference fields are eliminated by means of the shielding electrode, so that incorrect positioning can be avoided during deposition of the samples by means of contactless sample dispensers.

According to one particularly preferred embodiment of the invention, the shielding electrode comprises at least one electrode sleeve. The electrode sleeve is usually a hollow component, which extends in a longitudinal direction and has a round or angular cross section for example. The electrode sleeve is arranged on the substrate above the deposition position in such a way that the longitudinal direction runs essentially parallel to the movement direction of the sample during deposition of the sample. The electrode sleeve may be formed for example in the shape of a cylinder, a truncated cone or a shaft, and may comprise a compact wall material, which is closed over its surface or is interrupted in a net-like or rod-like manner.

According to one advantageous variant of the invention, a peripheral support collar is provided at one end of the electrode sleeve, by means of which the electrode sleeve can be fitted to the substrate or to a supporting device, such as an adjustment device for example.

According to one particularly advantageous embodiment of the invention, the shielding electrode comprises a plurality of electrode sleeves, which are arranged parallel and next to one another in a row or in a plane. The support collars may be joined for example to form a continuous base plate, from which the electrode sleeves protrude and which has through-holes in a manner corresponding to the positions of the electrode sleeves in each case.

Particular advantages for use of the invention in developed process techniques in biochemistry are obtained when the substrate is formed in a manner known per se by a reaction plate comprising a plurality of compartments, such as by a microtitre plate or nanotitre plate comprising a plurality of wells, for example, and the electrode sleeves are joined to one another in an arrangement corresponding to the compartment arrangement of the reaction plate, that is to say for example in the form of a matrix in straight rows and columns in a manner corresponding to the arrangement of wells of microtitre plates or nanotitre plates.

If, according to another embodiment of the invention, an adjustment device is provided for adjusting the position of the shielding electrode relative to the substrate, advantages may be obtained in respect of the handling of the substrate during further process steps. For example, the shielding electrode can be positioned on or above the substrate in such a way that mutual contact is avoided. This prevents any contamination of the substrate by the shielding electrode. According to preferred variants of the invention, the adjustment device comprises in particular a height adjustment and/or a lateral adjustment, by means of which the height of the shielding electrode above the plane of the substrate or the lateral alignment of the shielding electrode in particular relative to the edges of the substrate or the compartment walls can be adjusted.

If, according to another embodiment of the invention, the support collar of an electrode sleeve or the base plate formed by a plurality of electrode sleeves is equipped with an electrode terminal for connection to a reference potential, such as ground potential, for example, advantages may be obtained in respect of the handling of the shielding electrode and in particular the integration thereof in an experimental setup or a dispensing device.

According to the invention, the shielding electrode is preferably formed of metal or a conductive plastic. The use of metal may be advantageous in respect of the cleaning and reuse of the shielding electrode. The use of plastic simplifies the manufacture of disposable products.

According to a modified embodiment of the invention, the shielding electrode is permanently connected to the substrate. It is formed for example by a coating on the substrate surface in the vicinity of the deposition position for the sample. When the substrate comprises a reaction plate with a plurality of compartments, such as a microtitre plate or nanotitre plate with a plurality of wells, for example, the coating is preferably provided on the inner walls of the compartments (in particular wells) and on the upper side of the reaction plate for effective shielding purposes. As an alternative, the shielding electrode may be formed by the substrate itself, wherein in this case the substrate preferably consists at least partially of conductive plastic. Accordingly, a microtitre plate or nanotitre plate made of conductive plastic forms an independent subject matter of the invention. According to another aspect of the invention, with regard to the device, the aforementioned objective is solved by providing a shielding electrode for at least one compartment of a reaction plate, wherein the shielding electrode comprises at least one electrode sleeve on a support collar or a base plate, wherein the support collar or the base plate is designed to bear against the reaction plate in such a way that in each case an electrode sleeve protrudes into a respective compartment of the reaction plate.

According to a preferred embodiment of the invention, the shielding electrode comprises a plate-like compound consisting of a plurality of electrode sleeves, which are arranged in the form of a matrix in straight rows and columns on a base plate, which has through-holes in a manner corresponding to the positions of the electrode sleeves. Advantageously, the shielding electrode according to the invention can be produced in a form, which is compatible with the customary reaction plate formats, such as with the formats of microtitre plates or nanotitre plates, for example. For improved handling of the shielding electrode, the latter may be equipped with an engagement device for engagement of a gripper tool of a robot and/or with an adjustment device for height adjustment and/or lateral adjustment relative to the reaction plate.

Another subject matter of the invention is the use of a metal sleeve for electrostatic shielding during the deposition of samples or sample arrays onto a reaction plate by means of a contactless dispenser.

BRIEF DESCRIPTION OF THE SEVERAL VIEWS OF THE DRAWINGS

Advantageous uses of the invention are in medical or biochemical diagnostics, such as in food monitoring or in laboratory diagnostics, for example. Further advantages and details of the invention will become apparent from the description of the appended drawings, in which.

DETAILED DESCRIPTION OF THE INVENTION

Figure 1:
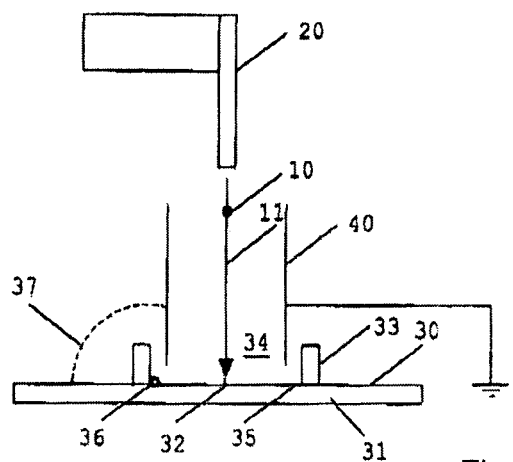
FIGS. 1 and 2 show schematic illustrations of the effect of the electrostatic shielding according to the invention.
Figure 2:
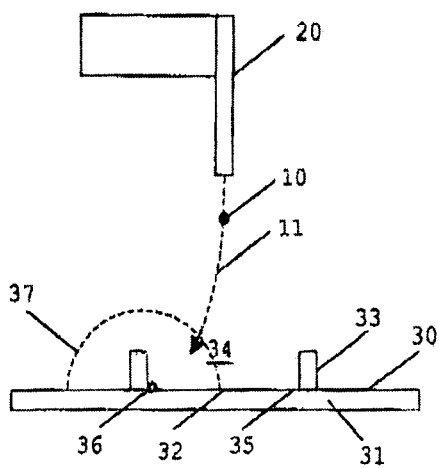

FIGS. 1 and 2 schematically illustrate the principle of the inventive electrostatic shielding of interference fields during the deposition of samples. In the conventional sample deposition technique (FIG. 2), a sample 10 in droplet or particle form is deposited onto a substrate 30 by means of a contactless (e.g. piezoelectric) sample dispenser 20. The substrate 30 comprises a substrate body 31, on the surface of which, by means of compartment walls 33, at least one compartment 34 is formed, on the bottom 35 of which a deposition position 32 for receiving a sample is located.

By virtue of the compartment formation, the deposition position 32 is spatially and materially delimited from other substrate regions in the vicinity. The substrate 30 consists for example entirely of plastic (e.g. polystyrene or polypropylene) or of a compound consisting of glass (substrate body 31) and plastic (compartment walls 33).

By virtue of frictional electricity or other charging phenomena, charge carriers at local potential minima may gather on the plastic surfaces. The charge carriers cannot flow off on account of the lack of electrical conductivity of the plastics used. By way of example, a charge 36 is shown in FIG. 2, from which there emanates an electrical field with the potential line 37 shown by way of example. The electrical field 37 forms an interference field for the movement of the sample 10 to the deposition position 32.

The sample 10 is for example a liquid droplet of an aqueous solution having a diameter of for example 50 to 70.mu.m and a volume of for example 100 pl. It is charged up, for example, as a result of charging processes during the piezoelectric droplet formation and/or as a result of dipole interactions, so that interaction with the interference field 37 occurs. For example, an attracting or repelling force effect on the sample 10 is formed. The trajectory 11 of the sample 10 (shown in dashed line) is deflected away from the deposition position 32 into the surroundings. This deflection is dependent upon the random distribution of the charges on the surface of the substrate and thus cannot be detected by calibration of the dispenser 20.

In order to prevent the undesirable deflection of the sample 10, the interference field 37 is electrostatically shielded according to the invention (FIG. 1). A field-free space is created, through which the trajectory 11 runs in a manner corresponding to a predefined movement course, e.g. in a straight line when using a stationary sample dispenser 20 or in a curved manner when using a moving sample dispenser 20. According to the preferred embodiment of the invention, the interference field 37 is shielded by means of the shielding electrode 40, which is connected to ground potential. The sample dispenser 20 is preferably arranged above the shielding electrode 40 and is separate therefrom. The sample 10 follows precisely the desired trajectory 11 towards the deposition position 32.

FIGS. 3 to 6 and 10 show different variants of a shielding electrode 40, which in each case comprises an electrode sleeve 41 and a support collar 42.

Figure 3:
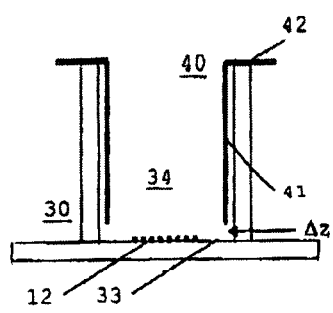
FIGS. 3 to 6 show embodiments of shielding electrodes according to the invention, which in each case have a single electrode sleeve.

According to FIG. 3, the shielding electrode 40 is designed to be suspended in a compartment 34 of the substrate 30. The electrode sleeve 41 has an external diameter, which is smaller than the internal diameter of the compartment 34. By means of the support collar 42, the shielding electrode 40 rests on the upper side of the substrate 30. The length of the electrode sleeve 41 is selected to be smaller than the depth of the compartment 34, so that a gap .DELTA.z remains between the lower, free end of the electrode sleeve 41 and the bottom 33 of the compartment 34.

The provision of the gap .DELTA.z has the advantage that the bottom 33 cannot be contaminated or mechanically damaged by the shielding electrode 40. The gap .DELTA.z can be selected as a function of the other dimensions of the compartment 34 and the shielding electrode 40 in such a way that the trajectory of the sample remains practically unaffected. The electrode sleeve 41 can be inserted into the compartment 34 by means of tweezers or magnetic grippers.

The substrate 30, which is illustrated schematically in FIG. 3 may, for example, be part of a microtitre plate or nanotitre plate. In the case of a microtitre plate, the compartment 34 has, for example, a depth of 10 mm to 12 mm and a diameter of 6 mm to 7 mm. The electrode sleeve 41, which is made of stainless steel, accordingly has an axial length of for example 13 mm and a diameter, which is selected to be smaller than the internal diameter of the compartment, so that contactless introduction of the sleeve into the compartment is possible. With the aforementioned dimensions, it is advantageously possible to arrange a sample array 12 having a matrix arrangement of 128 samples on the bottom 33 of the compartment 34. When using nanotitre plates, smaller dimensions are accordingly used. In general, a sample array may comprise at least 2, preferably 6 to 100 or more samples, depending on the specific use.

Figure 4:
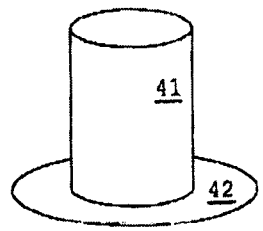

FIG. 4 shows a further variant of a shielding electrode 40 according to the invention having an electrode sleeve 41 and a support collar 42. This shielding electrode 40 can be suspended in a compartment of a substrate in a manner analogous to FIG. 3, or alternatively can be placed onto a substrate with a flat, even surface. In this case, the support collar 42 serves as a support face, which surrounds the desired deposition position on the substrate (not shown).

Figure 5:
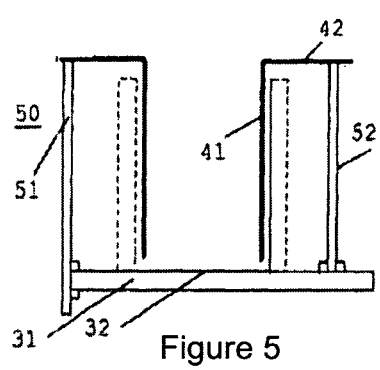

FIG. 5 illustrates a structure analogous to FIG. 3, in which features of an adjustment device 50 are shown. By means of the adjustment device 50, the shielding electrode 40 is held in a certain position relative to the deposition position 32. For this purpose, a height adjustment 51 and/or a lateral adjustment 52 is provided, depending on the properties of the substrate used. The height adjustment 51 consists, for example, of one or more supporting rods, the upper, free end of which forms a support for the support collar 42 of the shielding electrode 41 and the lower end of which is fixed in a slidable manner, for example, to the edge of the substrate body 31. For the lateral adjustment 52, one or more rods are provided in an analogous manner, the upper, free end of which once again forms a support for the support collar 42 and which are arranged in a slidable or adjustable manner on suitable positioning device, e.g. rails on the substrate surface. When using the adjustment device 50, the shielding electrode 40 can advantageously be arranged without direct contact between the shielding electrode 40 and the substrate body. The positioning of the shielding electrode 40 can in particular take place even without compartment walls (shown in dashed line).

Figure 6:
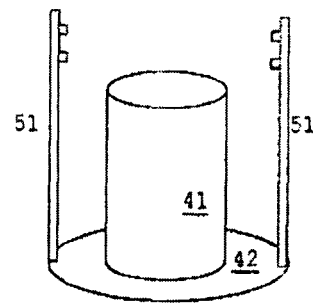

FIG. 6 shows a variant of the shielding electrode 40 with the adjustment device, in which it is attached, for example, to the side of a strip-shaped substrate. In a manner deviating from the illustrated example of embodiment, a number of height adjustments 51 or additionally lateral adjustments may be provided.

Figure 7:
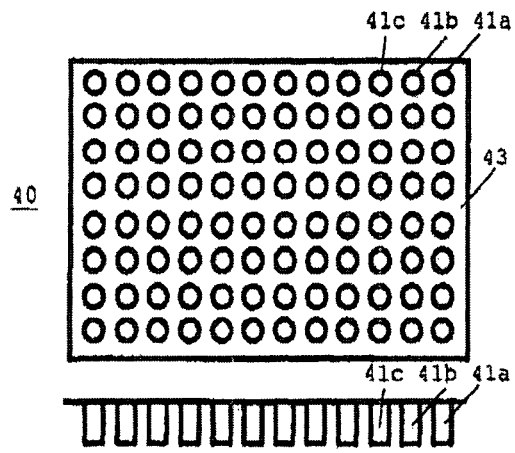
FIGS. 7 to 9 show embodiments of shielding electrodes according to the invention, which in each case have a plurality of electrode sleeves.
Figure 8:
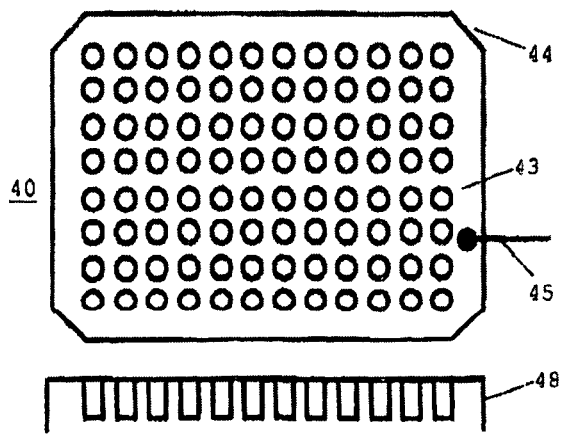
Figure 9:
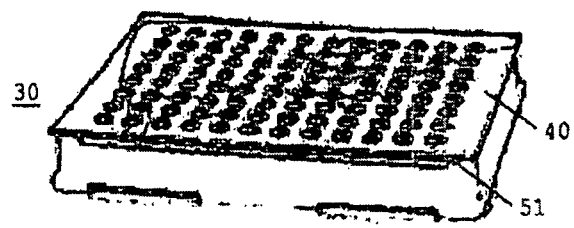

FIGS. 7, 8 and 9 illustrate embodiments of the invention in which the shielding electrode 40 forms a shielding mask, which has a plurality of electrode sleeves 41a, 41b, 41c . . . , which are arranged on a common base plate 43. Each electrode sleeve 41a, 41b, 41c . . . is formed by a tubular or hollow-cylindrical protrusion on the base plate 43, the latter having through-holes in a manner corresponding to the positions of the electrode sleeves. The geometric arrangement of the electrode sleeves 41a, 41b, 41c, . . . corresponds to the geometric arrangement of the wells of a microtitre plate. The figures show by way of example 96 shielding electrodes 40, which are provided for the 812 format of a 96-well microtitre plate.

The schematic top views in FIGS. 7 and 8 (top) illustrate the matrix arrangement of the electrode sleeves in straight rows and columns. FIG. 8 additionally schematically shows engagement devices 44, which are provided at the edge of the base plate 43. The engagement devices 44 serve for the engagement of a handling tool, such as a gripper tool of a robot, for example. FIG. 8 furthermore shows, at reference 45, an electrode terminal for connecting the shielding electrode 40 to a reference potential. A side view of the base plate 43 with the protruding electrode sleeves 41a, 41b, 41c, . . . is schematically shown in each case in the bottom part of FIGS. 7 and 8.

FIG. 9 illustrates an embodiment of a substrate 30 according to the invention which is equipped with a shielding electrode 40. The substrate 30 comprises a 96-well microtitre plate made of plastic, which is known per se. Provided on the upper side of the microtitre plate 30 are the sample compartments (wells), which in the diagram shown in FIG. 9 are covered by the shielding electrode 40. Protrusions, which serve for height adjustment 51, are located at the corners of the microtitre plate 30.

In the operating state, the shielding electrode 40 with the electrode sleeves pointing into the wells of the microtitre plate is placed onto the upper side of the microtitre plate and in particular onto the protrusions 51. Depending on the specific operating conditions (in particular the strength of the expected interference fields, the volume of the deposited samples), the shielding electrode 40 may be connected to ground potential via an electrode terminal.

The shielding electrode 40 illustrated in FIGS. 7 to 9 is made, for example, from stainless steel. The electrode sleeves are fixed to the base plate by hard soldering. The height of the electrode sleeves is for example 13 mm. The thickness of the base plate is, for example, 1 mm. The shielding electrode 40 may be formed with a different format of the electrode sleeve geometry and arrangement, depending on the reaction plate used. In particular, individual rows of electrode sleeves and/or electrode sleeves with a square cross section may be provided. The base plate may be split into electrode parts.

According to a modified embodiment, the base plate 43 of the shielding electrode 40 may be formed like a cover of a conventional microtitre plate. In this case, a peripheral angled strip 48 (see FIG. 8, bottom) is provided on the outer edge of the base plate 43, said strip preferably having a width which is selected to be equal to or slightly greater than the thickness of the microtitre plate. The strip 48 in this case forms the height adjustment for positioning the shielding electrode 40 above the microtitre plate. The shielding electrode 40 can itself be used as a cover for the microtitre plate, with a cover film optionally being provided on the upper side of the base plate prior to first use.

Figure 10:
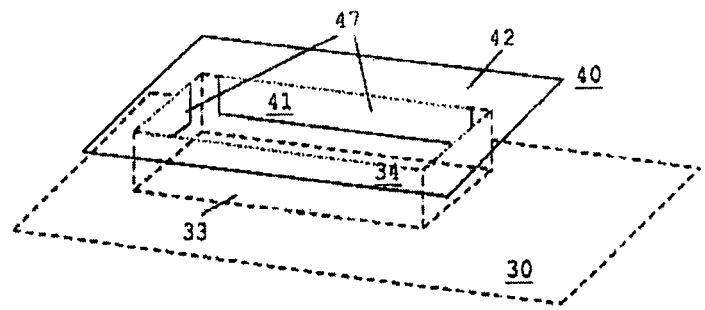
FIG. 10 shows an embodiment of a shielding electrode according to the invention, which has a tower-like electrode sleeve.

FIG. 10 shows a further embodiment of a shielding electrode 40 according to the invention comprising a single electrode sleeve 41, which is adapted to the geometric shape of a substrate 30 (shown in dashed line) comprising at least one box-shaped compartment 34. The shielding electrode 40 is formed by a metal plate or foil, which has been cut to fit and bent, said electrode having a rectangular, flat support collar 42 with an internal opening from which shielding wings 47 have been bent away so as to protrude into the compartment 34. For reasons of clarity, only two shielding wings 47 are shown. The shielding wings 47 form the shaft-like electrode sleeve 41 for inventively shielding the interior of the compartment against interference fields, in particular from the compartment walls 33.

Figure 11:
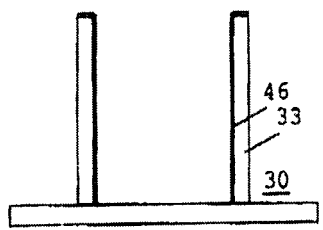
FIGS. 11 to 13 show further embodiments of shielding electrodes according to the invention.
Figure 12:
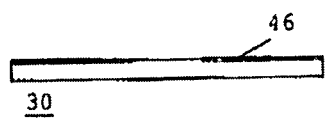

FIGS. 11 and 12 show embodiments of the invention in which the shielding electrode is formed by a shielding coating 46 on the substrate 30. In the case of a substrate having a compartment structure (FIG. 11), the shielding coating 46 is provided on the upper side and the inner sides of the compartment walls 33. In the case of a completely flat, unstructured substrate (FIG. 12), the shielding coating 46 is located in the vicinity of the desired deposition position 32. The shielding coating 46 consists, for example, of an inert metal (e.g. gold) or of a conductive plastic (e.g. polythiophenes, polyanilines, polypyrroles, polyvinylidene fluorides or the like). The thickness of the shielding coating 46 is preferably selected within the range from 10.mu.m to 0.5 mm. It is preferably produced by vapour deposition or dip coating.

Figure 13:
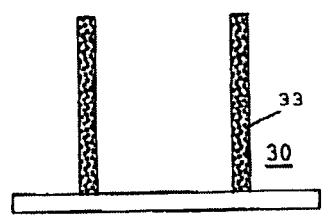

FIG. 13 illustrates the variant of a shielding electrode in which the latter is formed by part of the substrate, namely by the compartment walls 33. The substrate 30, which is designed for example as a microtitre plate or nanotitre plate and has a base plate 33 made of glass, has a compartment structure made of conductive plastic (see above). In this case, the function of the shielding electrode is performed by the compartment walls 33. As an alternative to the embodiment of the invention shown in FIG. 13, it is also possible for the entire reaction plate, in particular the microtitre plate or nanotitre plate, to be made of conductive plastic.

The features of the invention which are disclosed in the description, the drawings and the claims may be important both individually and in combination for implementing the invention in its various embodiments.

What is claimed is:

1. A method of depositing samples, in which at least one sample is arranged on a substrate, said method comprising the steps of:
   positioning a sample dispenser above the substrate, and
   actuating the sample dispenser so that a sample is moved from the sample dispenser along a trajectory to a predefined deposition position on the substrate, and
   shielding at least part of the trajectory against electrical interference fields, wherein the shielding step is comprised of moving the sample along the trajectory such that the sample is shielded against electrical interference fields by a shielding electrode, the shielding electrode being configured to be around and along the trajectory, the shielding electrode having an electrical ground potential,
   wherein the shielding electrode is comprised of an electrically-grounded and electrically conductive hollow cylinder having a center line, the cylinder being configured to be located between and to fit between the sample dispenser and the substrate, and cylinder being oriented substantially orthogonal to the substrate and substantially parallel to the trajectory, the deposition position being aligned with the center line of the cylinder.

2. The method according to claim 1 in which at least one of: at least one electrode sleeve, a coating on the substrate and a conductive part of the substrate is used as the shielding electrode.

3. The method according to claim 1 in which the steps of positioning and actuating the sample dispenser are carried out a number of times in succession, so that a number of samples are arranged at different deposition positions on different trajectories and form at least one sample array on the substrate, wherein the trajectories leading to a respective sample array are jointly shielded against electrical interference fields by the shielding electrode.

4. The method according to claim 1, in which it is used as the substrate is a reaction plate comprising compartments, on the bottoms of which the samples or a number of sample arrays are deposited.

5. The method according to claim 2, in which it is used as the substrate is a reaction plate a microtitre plate or a nanotitre plate comprising an arrangement of wells, on the bottoms of which the sample or at least one sample array is deposited.

6. A method of depositing samples, in which at least one sample is arranged on a substrate, said method comprising the steps of:
   positioning a sample dispenser above the substrate, and
   actuating the sample dispenser so that a sample is moved from the sample dispenser along a trajectory to a predefined deposition position on the substrate, and
   shielding at least part of the trajectory against electrical interference fields, wherein the shielding step is comprised of moving the sample along the trajectory such that the sample is shielded against electrical interference fields by a shielding electrode, the shielding electrode being configured to be around and along the trajectory, the shielding electrode having an electrical potential, preferably ground potential wherein the shielding electrode is comprised of an electrically-grounded and electrically conductive hollow cylinder having a center line, the cylinder being configured to be located between and to fit between the sample dispenser and the substrate, and the cylinder being oriented substantially orthogonal to the substrate and substantially parallel to the trajectory, the deposition position being aligned with the center line of the cylinder, wherein the step of actuating the sample dispenser is comprised of moving a sample in a substantially straight line, substantially parallel to the center line of the cylinder said substrate being a reaction plate or nanoliter plate comprising an arrangement of wells or compartments having side walls and bottoms, on the bottoms of which the sample or at least one sample array is deposited, in which the shielding electrode provides electrical shielding against electrical interference fields emanating from the side walls of the compartments or wells.

7. A method of depositing samples, in which at least one sample is arranged on a substrate, said method comprising the steps of:
   positioning a sample dispenser above the substrate, and
   actuating the sample dispenser so that a sample is moved from the sample dispenser along a trajectory to a predefined deposition position on the substrate, and
   shielding at least part of the trajectory against electrical interference fields, wherein the shielding step is comprised of moving the sample along the trajectory such that the sample is shielded against electrical interference fields by a shielding electrode, the shielding electrode being configured to be around and along the trajectory, the shielding electrode having an electrical ground potential
   wherein the shielding electrode is comprised of an electrically-grounded and electrically conductive hollow cylinder having a center line, the cylinder being configured to be located between and to fit between the sample dispenser and the substrate, and the cylinder being oriented substantially orthogonal to the substrate and substantially parallel to the trajectory, the deposition position being aligned with the center line of the cylinder, wherein the step of actuating the sample dispenser is comprised of moving a sample in a substantially straight line, substantially parallel to the center line of the cylinder said substrate being a reaction plate or nanoliter plate comprising an arrangement of wells or compartments having side walls and bottoms, on the bottoms of which the sample or at least one sample array is deposited, and the shielding electrode provides electrical shielding against electrical interference fields emanating from the side walls of the compartments or wells, in which a the shielding electrode comprises a plurality of electrode sleeves used for electrical shielding purposes, each of said electrode sleeves being provided for one of the wells or compartments.

8. An apparatus for depositing samples, in which at least one sample is arranged on a substrate, comprising:
    a sample dispenser; and
    a substrate comprising a substrate body having a surface, on the surface having at least one deposition position oriented below the dispenser having at least one deposition position, and a shielding electrode located above the substrate aligned with and separated from the at least one deposition position, the shielding electrode being configured, to electrostatically shield at least the a space within the electrode and thereby enable a sample actuated by the dispenser to travel through the shielding electrode on a trajectory in a substantially straight line, and to thereby strike the at least one deposition position without being subjected to electrical interference fields, the shielding electrode having an electrical ground potential wherein the shielding electrode is comprised of an electrically-grounded and electrically conductive hollow cylinder having a center line, the cylinder being configured to be located between and to fit between the sample dispenser and the substrate, and the cylinder being oriented substantially orthogonal to the substrate and substantially parallel to the trajectory, the deposition position being aligned with the center line of the cylinder.

9. The substrate apparatus according to claim 8, in which the shielding electrode comprises at least one electrode sleeve having first and second ends, the at least one electrode sleeve having a peripheral support collar at one end.

10. The substrate apparatus according to claim 9, in which the shielding electrode comprises a plurality of electrode sleeves, the plurality of electrode sleeves having support collars of the plurality of electrode sleeves that are joined to form a base plate.

11. The substrate apparatus according to claim 10, wherein in the substrate is formed by a microtitre plate or nanotitre plate comprising a plurality of wells, wherein the plurality of electrode sleeves are positioned on the base plate in the form of a matrix in substantially straight rows and columns in a manner corresponding to arrangement of the wells of the microtitre plate or nanotitre plate.

12. The apparatus according to claim 9, in which an adjustment device is provided, by which a position of the at least one electrode sleeve relative to the substrate can be adjusted.

13. The apparatus according to claim 12, in which the adjustment device comprises a height adjustment and/or a lateral adjustment.

14. The apparatus according to claim 9, in which the support collar or the base plate has an electrode terminal for connection to a reference potential.

15. The apparatus according to claim 9, in which the shielding electrode is formed of metal or electrically conductive plastic.

16. The apparatus according to claim 8, in which the shielding electrode is formed at least partially by the substrate.

17. The apparatus according to claim 8, in which the substrate is formed by a microtitre plate or nanotitre plate.

18. An apparatus for depositing samples, in which at least one sample is arranged on a substrate comprising:
    a sample dispenser; and
    a substrate comprising a substrate body having a surface, on the surface having at least one deposition position and
    a shielding electrode located above, aligned with and separated from the at least one deposition position, the shielding electrode being configured, to electrostatically shield at least a space within the electrode and thereby enable a sample actuated by the dispenser to travel through the shielding electrode on a trajectory in a substantially straight line, and to thereby strike the at least one deposition position without being subjected to electrical interference fields, the shielding electrode having an electrical ground potential wherein the shielding electrode is comprised of an electrically-grounded and electrically conductive hollow cylinder having a center line, the cylinder being configured to be located between and to fit between the sample dispenser and the substrate, and the cylinder being oriented substantially orthogonal to the substrate and substantially parallel to the trajectory, the deposition position being aligned with the center line of the cylinder, said substrate being a reaction plate or nanoliter plate comprising an arrangement of wells or compartments having side walls and bottoms, on the bottoms of which the sample or at least one sample array is deposited in which the shielding electrode provides electrical shielding against electrical interference fields emanating from the side walls of the compartments or wells.

19. An apparatus for depositing samples, in which at least one sample is arranged on a substrate comprising:
    a sample dispenser; and
    a substrate comprising a substrate body having a surface, on the surface having at least one deposition position and
    a shielding electrode located above, aligned with and separated from the at least one deposition position, the shielding electrode being configured, to electrostatically shield at least a space within the electrode and thereby enable a sample actuated by the dispenser to travel through the shielding electrode on a trajectory in a substantially straight line, and to thereby strike the at least one deposition position without being subjected to electrical interference fields, the shielding electrode being configured to be around and along the trajectory, the shielding electrode having an electrical ground potential wherein the shielding electrode is comprised of an electrically-grounded and electrically conductive hollow cylinder having a center line, the cylinder being configured to be located between and to fit between the sample dispenser and the substrate, and the cylinder being oriented substantially orthogonal to the substrate and substantially parallel to the trajectory, the deposition position being aligned with the center line of the cylinder, said substrate being a reaction plate or nanoliter plate comprising an arrangement of wells or compartments having side walls and bottoms, on the bottoms of which the sample or at least one sample array is deposited, and the shielding electrode provides electrical shielding against electrical interference fields emanating from the side walls of the compartments or wells, in which the shielding electrode comprises a plurality of electrode sleeves is used for electrical shielding purposes, each of said electrode sleeves being provided for one of the wells or compartments.

* * * * *